US007386492B2

(12) United States Patent  
Ginsburg et al.

(10) Patent No.: US 7,386,492 B2  
(45) Date of Patent: Jun. 10, 2008

(54) INVENTORY AND REVENUE MAXIMIZATION METHOD AND SYSTEM

(75) Inventors: Allan Ginsburg, Rockville, MD (US); David R. Murray, Winter Garden, FL (US); Arthur Weinberger, Cary, NC (US); Jerome Williams, Durham, NC (US)

(73) Assignee: Clear Channel Communications, Inc., San Antonio, TX (US)

( * ) Notice: Subject to any disclaimer, the term of this patent is extended or adjusted under 35 U.S.C. 154(b) by 4 days.

(21) Appl. No.: 10/045,089

(22) Filed: Jan. 15, 2002

(65) Prior Publication Data

US 2003/0154142 A1   Aug. 14, 2003

(51) Int. Cl.  
*G06Q 10/00* (2006.01)
(52) U.S. Cl. ...................................... 705/28
(58) Field of Classification Search ................ 705/14, 705/26, 11

See application file for complete search history.

(56) References Cited

U.S. PATENT DOCUMENTS

| | | | |
|---|---|---|---|
| 3,605,089 A | 9/1971 | Gray | |
| 3,651,478 A | 3/1972 | Shandlay | |
| 4,025,766 A | 5/1977 | Ng et al. | |
| 4,509,123 A | 4/1985 | Vereen | |
| 4,700,295 A | 10/1987 | Katsof et al. | |
| 5,216,594 A | 6/1993 | White et al. | |
| 5,241,467 A | 8/1993 | Failing et al. | |
| 5,255,184 A | 10/1993 | Hornick et al. | |
| 5,383,112 A | 1/1995 | Clark | |

(Continued)

OTHER PUBLICATIONS

Hofmeister, Sallie; "Company Town; Clear Channel to Buy SFX Entertainment; Mergers $3- billion stock deal would enable media firm to package its outlets with arena sponsorships for advertisers", Mar. 1, 2000, LA Times, Business Section Part C.*

(Continued)

*Primary Examiner*—James A. Kramer  
*Assistant Examiner*—Jason Borlinghaus  
(74) *Attorney, Agent, or Firm*—Andrews Kurth LLP

(57) ABSTRACT

A method is provided for enterprise management and bundling of radio, outdoor and entertainment inventory to achieve maximum revenue on perishable products. An electronic data-mart 110 or central information storage and data processing system is established to collect influencing factors for the probability and price sensitivity of a particular advertising buyer 120. The data-mart 110 also collects business rules for inventory scaling, available inventory to sell, budget (goal) information, advertiser payment history, and station performance data to feed to a scenario planner 130. Once three or more variables exist, inventory and pricing fuzzy logic algorithms create scenario plans to present the most profitable bundle of offerings. The scenarios are typically pre-approved although presented to the local business units 150 for an abnormality failsafe. Once processed by the local business units 150, the scenarios are presented to the advertising buyer 120. Negotiations typically take place which cause for the process to restart. The main systems that interact to build these scenarios are: an enterprise data-mart 110, a scenario planner 130, a performance measure system 170, a rate or yield management subsystem 160, a traffic and accounts receivable system 180 and a similarly configured local inventory booking system 190. A business rules engine provides the local rule definitions for scaling inventory and price to provide for the most profitable combination.

6 Claims, 8 Drawing Sheets

U.S. PATENT DOCUMENTS

| | | | |
|---|---|---|---|
| 5,404,291 A | | 4/1995 | Kerr et al. |
| 5,515,270 A | * | 5/1996 | Weinblatt ............... 705/14 |
| 5,594,899 A | | 1/1997 | Knudsen et al. |
| 5,615,109 A | * | 3/1997 | Eder ...................... 705/8 |
| 5,630,121 A | | 5/1997 | Braden-Harder et al. |
| 5,712,989 A | | 1/1998 | Johnson et al. |
| 5,724,521 A | * | 3/1998 | Dedrick ................. 705/26 |
| 5,758,149 A | | 5/1998 | Bierma et al. |
| 5,758,328 A | | 5/1998 | Giovannoli |
| 5,758,329 A | | 5/1998 | Wojcik et al. |
| 5,761,432 A | | 6/1998 | Bergholm et al. |
| 5,765,143 A | | 6/1998 | Sheldon et al. |
| 5,771,172 A | | 6/1998 | Yamamoto et al. |
| 5,848,399 A | | 12/1998 | Burke |
| 5,854,746 A | | 12/1998 | Yamamoto et al. |
| 5,870,733 A | | 2/1999 | Bass et al. |
| 5,918,209 A | | 6/1999 | Campbell et al. |
| 5,960,414 A | | 9/1999 | Rand et al. |
| 6,041,308 A | | 3/2000 | Walker et al. |
| 6,061,691 A | | 5/2000 | Fox |
| 6,085,169 A | | 7/2000 | Walker et al. |
| 6,108,639 A | | 8/2000 | Walker et al. |
| 6,134,534 A | | 10/2000 | Walker et al. |
| 6,138,105 A | | 10/2000 | Walker et al. |
| 6,195,646 B1 | * | 2/2001 | Grosh et al. ........... 705/26 |
| 6,240,396 B1 | | 5/2001 | Walker et al. |
| 6,253,187 B1 | | 6/2001 | Fox |
| 6,260,024 B1 | | 7/2001 | Shkedy |
| 6,260,047 B1 | | 7/2001 | Fox et al. |
| 6,263,315 B1 | | 7/2001 | Talluri |
| 6,286,005 B1 | * | 9/2001 | Cannon .................. 707/100 |
| 6,341,269 B1 | | 1/2002 | Dulaney et al. |
| 6,366,890 B1 | | 4/2002 | Usrey |
| 6,430,603 B2 | * | 8/2002 | Hunter ................... 709/207 |
| 6,567,824 B2 | | 5/2003 | Fox |
| 6,839,681 B1 | * | 1/2005 | Hotz ...................... 705/10 |
| 6,937,996 B1 | * | 8/2005 | Forsythe et al. ........ 705/16 |
| 2003/0050827 A1 | * | 3/2003 | Hennessey ............. 705/10 |

OTHER PUBLICATIONS

Moon, Thom; "Deal creates radio giant", Tampa Tribune, Oct. 5, 1999, Business and Finance section.*

Mnich, Matt, "Deal May Affet Ties of Stations To Polaris", Columbus Dispatch, Mar. 4, 2000, Features—Accent and Arts section, p. 3H.*

"Yield Management-Revenue Management", (2001), p. 1, Horand Vogel & Associates Management Consultants, Germany, www.horand-vogel.de/index.htm.

Net Yield: About Us, (2001), p. 1, LAN Infosystems, Braintree, www.laninfor.com/AboutUs.htm.

Net Yield Seafood Inventory Software, (2001), p. 1, LAN Infosystems, Braintree, www.laninfor.com/index.html.

Net Yield-Training and Consulting, (2001), p. 1, LAN Infosystems, Braintree, www.laninfo.com/Service.htm.

"CMI Director: Steven Nahmias", (2001), pp. 1-2, CMI Santa Clara University, Santa Clara, http://business.scu.edu/CMI/chair.html.

OMIS Faculty Research-Dr. Steven Nahmias, (2001), pp. 1-5, OMIS Santa Clara University, Santa Clara, http://omis.scu.edu/faculty/Research/nahmias_research.htm.

IYMRS:YM Resources, (2000), pp. 1-4, IYMRS, www-mugc.cc.monash.edu.au/~kfarrell/iymrs/resources.html.

IYMRS: Bibliography, (2001), pp. 1-4, IYMRS, http://www-mugc.cc.monash.edu.au/~kfarrell/iymrs/biblio.html.

RM Articles, (2001), pp. 1-4, www.abovetheweather.com/articles.asp.

NAB Information Resource Center Home Page, (2001), p. 1, NAB Information Resource Center, Washington, DC, www.nab.org/irc/.

National Association of Broadcasters: Yield Management Session (1992), pp. 1-12.

Pro-Rate: Mega Rates Software For Radio, pp. 1-23, RCS, Scarsdale, New York.

APICS Catalog Directory-Educational Materials Search: Integrated Inventory Management, (2001), p. 1, APICS, Alexandria, VA, www.apics.org/scripts/bookstore/catalogfind.asp?id=310&title=true.

APICS Catalog Directory-Educational Materials Search: Power Pricing, (2001), p. 1, APICS, Alexandria, VA, www.apics.oirg/scripts/bookstore/catalogfind.asp?id=462&title=true.

APICS Catalog Directory-Educational Materials Search: Demand Forecasting and Inventory Control, (2001), p. 1, APICS, Alexandria, VA, www.apics.org/scripts/bookstore/catalogfind.asp?id=205&title=true.

McNeil, "Re: revenue management seminar paper", (2001), pp. 1-2, Web Forum-Virtual Academy in Yield Management, www.mcb.co.uk/services/conferen/webforum/va-yield/45.html.

Levine et al., "Yield Management Techniques and the Sale of Broadcast Advertising Time", (1991), pp. 1-4, Arthur D. Little Inc.

Cross et al., "Yield Management", Futurescope, (Apr. 1991), pp. IV-1 through IV-4, Decision Resources, Inc.

Cross, Revenue Management—Hard-Core Tactics for Market Domination, (1997), Broadway Books, New York, NY.

Ingold et al., Yield Management—Strategies For The Service Industries, (2000), pp. 53-54, 179-182, 205-206, Continuum, London.

Little, Revenue Enhancement Opportunities Through Yield Management, (1991), San Francisco, Ref. No. YM100.

Fox, Pricing and Rate Forecasting Using Broadcast Yield Management, (1992), National Association of Broadcasters, Washington, DC.

Strasser (Editor), "Strategic Advantage From Information Technology", Perspectives, Spr. 1994, Decision Focus Incorporated, Washington, DC, ISBN 0-89324-150-4.

McKenna, "Aggregate Economic Analysis", (1965), Library of Congress, Washington, DC.

Chang, "Computerized Reservation Systems", Emergent Innovations in Information Transfer Processing and Decision Making, (1992), IEEE Systems, vol. 2.

Ulusoy, "An Annotated Bibliography on Real-Time Database Systems", SIGMOD (1995), pp. 40-45, vol. 24, No. 4, Record, Turkey.

Loomba et al., Readings in Management Science, Chapter 11, "Management Information Systems and Sensitivity Analysis", (1976), Business Publications Inc., Dallas.

Thomasian, "A Fractional Data Allocation Method for Distributed Databases", Proceedings of the Third Int'l Conference on Parallel and Distributed Information Systems, (1994), pp. 168-175, IEEE, Washington.

Copeland et al., "Sabre: The Development of Information-Based Competence and Execution of Information-Based Competition", IEEE Annals of the History of Computing, (1995), pp. 30-56, vol. 17, No. 3, IEEE.

Eklund, "The Reservisor Automated Airline Reservation System: Combining Communications and Computing", IEEE Annals of the History of Computing, (1994), pp. 62-69, vol. 16, No. 1, IEEE.

Dornian, "ReserVec: Trans-Canada Air Lines' Computerized Reservation System", IEEE Annals of the History of Computing, (1994), pp. 31-42, vol. 16, No. 2, IEEE.

Burns, "Global Distribution Systems: A Glimpse of the Future", Hospitality & Automation, Oct./Nov. 1994, two pages, http://burns-htc.com/Articles/GDS%20Glimpse%20US.htm.

Burns, "Electronic GDS Distribution—What Are Your Options?", H & A Report, vol. III, Issue 5, Jan./Feb. 1996, 6 pages, http://burns-htc.com/Articles/Electronic%20Distribution%20Options.htm.

Burns, "Seamless—The New GDS Connectivity Standard", H & A Report, vol. III, Issue 5, Jan./Feb. 1996, three pages, http://burns-htc.com/Articles/Seamless.htm.

Burns, "The Evolving Role of the Central Reservation System", H & A Report, vol. IV, Issue 3, Jan./Feb. 1997, two pages, http://burns-htc.com/Articles/Evolving%20Role%20%of20CRS.htm.

McGill et al., "Revenue Management: Research Overview and Prospects", Transportation Science, (1999), pp. 233-256, vol. 33, No. 2, Institute of Operations Research and the Management Sciences.

TuScan.com, "Omaga 32", May 20, 2001, one page, http://www.TuScan.com/Innovation.htm.

Encoda Systems, "Sales Analysis Plus", May 20, 2001, one page, http://www.ecodasystems.com/solutions/radio/sales-analysis-plus.htm.

Hyatt, "You won't have any reservations about this new System", May 20, 2001, two pages, http://www.hyatt.com/travel-agents/news1-2.html.

Burns, "Evolving Role of the Central Res System", Lodging, May 1997, two pages, http://burns-htc.com/Articles/Lodging-Evolving%20Role.htm.

Liberman, "*Debunking the Myths of Yield Management*", The Cornell H.R.A. Quarterly, (1993), pp. 34-41, Cornell University.

Liberman, "*Making Yield Management Work for You: Ten Steps to Enhanced Revenues*", Travel Tourism and Hospitality Bulletin of Arthur D. Little Inc., (1991), Vertec Solutions Inc., Belmont, CA.

Liberman, "*A Revolution Is Brewing in Pricing*", Los Angeles Times, (Jun. 6, 1990), Los Angeles Times.

Liberman, "*Effective Revenue Management*", Cruise Industry News, (1991), Cruise Industry News Nissen-Lie Communications Inc., New York.

Davis, "*Airline Ties Profitability Yield to Management*", Siam News, (1994), vol. 27, No. 5, 5 pages.

Chang, "*Computerized Reservation Systems*", (1992), pp. 1248-1249, IEEE.

"*Price It Right . . . With RateMinder*", (2001), pp. 1-2, Custom Business Systems Int'l, www.cbsi.org/rminder.htm.

Crandall, "*How Airline Pricing Works*", (2001), pp. 1-3, American Way-Vantage Point, www.aa.com/away/Vantage/Vantage_may98.htm.

"*Revenue Management & Pricing Theory& Implementation*", Profit Optimization Strategies Inc. (Oct. 14, 1998), pp. 1-6, www.mugc.cc.monash.edu.au/~kfarrell/iymrs/RMDetl/Default.htm.

"*Demand Pricing*", (2000), p. 1, Marketron, www.marketron.com/products/modules/demandpricing.html.

"*Reservations and Yield Management Study Group 1996 Meeting Presentations and Working Papers*", (1996), pp. 1-2, AGIFORS, www.agifors.org/cgi-bin/agifors/get-papers.p1?year=1996.

"*Reservations and Yield Management Study Group 1997 Meeting Presentations and Working Papers*", (1997), pp. 1-2, AGIFORS, www.agifors.org/cgi-bin/agifors/get-papers.p1?year=1997.

"*Reservations and Yield Management Study Group 1997 Meeting*", (1997), pp. 1-5, AGIFORS, www.agifors.org/rymsg/1997/.

"*Definition and history of Yield Management*", (2001), pp. 1-3, Optims, www.prologic.fr/UK/hight_profits.html.

"*Fields of Application for Yield Management*", (2001), pp. 1-2, Optims, www.prologic.fr/UK/observatory_1.html.

"*Above Revenue Management*", (2001), pp. 1-5, PROS Revenue Management, www.prosrm.com/about.asp?root=about&page=revenuemanagement&.

Kahn, "*Broadcasting Revenue Management*", (2001), pp. 1-2, PROS Revenue Management, www.prosrm.com/conference/Broadcasting/broadcasting.htm.

"*Broadcasting*", (2001), pp. 1-4, PROS Revenue Management, www.prosrm.com/industry.asp?page=Broadcasting.

PROS Revenue Management: Home Page, (2001), pp. 1-5, PROS Revenue Management, www.prosrm.com/.

Companies using RM, (2001), pp. 1-8, www.abovetheweather.com/companies.asp.

\* cited by examiner

Fig. 8

| | 7/9 Mon | 7/10 Tue | 7/11 Wed | 7/12 Thu | 7/13 Fri | 7/14 Sat | 7/15 Sun | Weekly Totals |
|---|---|---|---|---|---|---|---|---|
| AM | $60<br>12<br>48<br>75% | $55<br>13<br>48<br>78% | $70<br>10<br>48<br>80% | $70<br>10<br>48<br>85% | $80<br>9<br>48<br>40% | $40<br>30<br>48<br>15% | $20<br>30<br>48<br>15% | 138<br>336<br>32% |
| MID | $80<br>5<br>60<br>75% | $75<br>6<br>60<br>78% | $85<br>5<br>60<br>80% | $90<br>4<br>60<br>85% | $90<br>4<br>60<br>40% | $60<br>12<br>60<br>15% | $40<br>12<br>60<br>15% | 108<br>336<br>32% |
| PM | $45<br>5<br>48<br>75% | $48<br>6<br>48<br>78% | $50<br>5<br>48<br>80% | $90<br>4<br>48<br>85% | $90<br>4<br>48<br>40% | $40<br>12<br>48<br>15% | $35<br>12<br>48<br>15% | 108<br>336<br>32% |
| EV | $20<br>33<br>60<br>75% | $15<br>35<br>60<br>78% | $35<br>32<br>60<br>80% | $38<br>30<br>60<br>85% | $38<br>30<br>60<br>40% | $35<br>28<br>60<br>15% | $32<br>30<br>60<br>15% | 108<br>336<br>32% |
| ON | $1<br>45<br>72<br>75% | $1<br>44<br>72<br>78% | $2<br>40<br>72<br>80% | $2<br>41<br>72<br>85% | $4<br>36<br>72<br>40% | $4<br>36<br>72<br>15% | $1<br>46<br>72<br>15% | 108<br>336<br>32% |
| Daily Totals | 138<br>336<br>32% | 138<br>336<br>32% | 138<br>336<br>32% | 138<br>336<br>32% | 138<br>336<br>32% | 138<br>336<br>32% | 138<br>336<br>32% | TOTAL<br>138<br>336<br>32% |

INVENTORY AND REVENUE MAXIMIZATION METHOD AND SYSTEM

BACKGROUND OF THE INVENTION

1) Field of the Invention

The present invention relates to a method and system for providing enterprise management and bundling of perishable inventory which varies in value over its life and is susceptible to value-based pricing to achieve maximum revenue. More specifically, the present invention maximizes revenue of perishable inventory such as television (TV), radio and outdoor advertisements and entertainment industry events using multiple variables in inventory control and optionally pricing fuzzy logic algorithms to create scenario plans which present the most profitable bundling of offerings and which meet the customer's needs.

2) Discussion of Related Art

Inventory or revenue management systems and methods have been in existence at least since the early 1980's when the airline and car rental industries began adopting revenue management as a regular business practice, the history of which is provided in Robert Gross, *Revenue Management—Hard-Core Tactics for Market Domination*, Broadway Books, New York 1997, herein incorporated by reference. The basic premise is that revenue can be increased by managing the yield from inventory. Yield management is the practice of maximizing profits from the sale of a perishable inventory, such as advertising time, airline seats, cruise berths, rental cars, hotel rooms, etc., through the systematic use of historical purchasing information, pricing and inventory controls and customer service improvements. A yield management program reveals demand for a product that was formerly not apparent and manages this demand to maximize revenues.

Yield management concepts apply to many industries which are susceptible to value-based pricing. When different sets of potential recurring customers value a product or service differently, a yield management system introduces a pricing structure which provides that product to customers at a price consistent with their individual evaluation or price sensitivity. By designing products that meet the specific needs of potential customers and charging multiple prices, this value-based pricing increases the customer base and profits from sales. Yield management not only works to identify appropriate locations for discounting prices in order to increase sales, but also to identify opportunities to increase the price as well. Ideally, when the profitability of inventory sales varies, product availability must be controlled so that the product is not sold out too early, or left unsold at its expiration date (e.g., air time, travel time or other time of performance).

Previously, informal yield inventory management systems operated by the intuition of managers who had sufficient experience and confidence to make decisions as to who to sell to, when to sell and at what price. However, such approaches were haphazard at best, and the actual yield largely depended upon the talent of individuals who were managing the inventory, their stability and experience.

More recently, inventory management has utilized increasing capabilities of computer technology. However, existing automated systems tend to follow simple two-dimensional pricing models for local markets. For instance, U.S. Pat. No. 6,061,691 to Fox discloses a method and system for inventory management which includes a yield management system, a price forecasting system, and a traffic billing system. An inventory item such as available advertising time associated with a specific time period or program is presented to a customer together with a price quotation. The price quotation is generated using the price forecasting system and by a pricing strategy in the yield management system. When the customer requests a specific inventory item, it is placed into a traffic billing system and that inventory item is removed from inventory. The Fox patent also follows the conventional practice of accounting for reservations of advertising time, which are not closed sales but rather requests that a particular advertising time be held for a customer. A weight representing a probability of close is assigned to the reservation for utilization in the yield management and price forecasting systems.

The price forecasting system disclosed in the Fox patent is updated with the changed inventory or reservation before the next customer makes a request, instead of using batch processing of this information, such that the information effects price quotes from the price forecasting system before the next customer request. Such a system is computationally intense and probably not suitable for a large enterprise system.

In these types of inventory management systems, the yield management system uses simple availability curves as pricing models wherein the rate at which advertising time is sold is based on the availability of a fixed amount of advertising time and the proximity the request is to the inventory item expiring (e.g., airtime). Generally speaking, the closer to the time an advertisement is to be aired or the more urgent the request, the higher the price the advertising time can be since the potential customer values the air time to a greater extent than a customer who is planning ahead. This concept has long been used in the airline industry, wherein the last minute business traveler is charged a greater rate than an incidental tourist planning ahead. Simple two-dimensional sample demand curves are illustrated by two-dimensional graphs, the starting point of which and the number of units being determined in advance by management.

While these simple demand curves can prove adequate for many applications such as serving local markets, it does not take into consideration other factors that could greatly influence and improve the customer's experience while maximizing monetary yield from the inventory. Information beyond mere demand curves and available inventory might be important in a customer's decision. The gathering of the appropriate information is left to the talent and experience of the selling agent or even the customer him or herself in these preexisting systems. For instance, a customer may want to know the Arbitron® ratings of various radio shows, and the potential frequency an advertisement might be heard by an individual listener and the number of people by whom the advertisement is heard. This information typically comes from the selling agent, but an individual agent can only know, gather and/or keep up-to-date on so much information and generally only about a single local market.

Also, these conventional systems presuppose a fixed amount of advertising time as its total inventory for a time period, and pricing is the single major variable used to maximize revenue. In fact, some commentators have indicated that adding units is not appropriate at all, let alone on a dynamic basis in reaction to demand. See, Fox, *Pricing and Inventory Management in Today's Broadcast Environment*, National Association of Broadcasters, 1997, pp. 30-31.

These conventional systems, because they depend on the skills and knowledge of a selling agent, tend not to be suitable for an enterprise made up of a number of business units in the same and/or different markets or for customers desiring to reach multiple markets.

Additionally, these systems can be subject to input "noise" due to managers and the like accumulating orders before entry into the traffic system. If accommodations are not made, these apparent sharp rises in unit selling rate can lead to a false impression of high or increased demand for a given set of inventory items. For instance, if a manager enters the orders accumulated over a week's time on a Friday, the price forecasting system may view Friday's traffic as a large increase in demand for the type of inventory sold and increase prices beyond what the market will accept.

SUMMARY OF THE INVENTION

A need exists for redesigned and improved inventory management system which takes a very different approach to maximizing yield. The present invention can increase yield while improving the customer experience by taking into consideration additional factors in price forecasting. The yield management can include increasing or decreasing the amount of inventory, for instance, by changing the number of commercial slots per unit of time (e.g., units per hour). Herein, the inventory units, whether time slots for commercials, outdoor advertisements, airline seats, berths, rental cars, or any other perishable inventory susceptible to inventory management under the present application, will be referred to as "units".

An additional need persists to manipulate inventory to maximize revenue using a combination of four prime variables: total hourly units, product category, buyer history and price. The present invention uses, optimally through powerful computing and real-time aggregation, a complex set of factors applied to multiple scenarios to achieve maximum revenue. The invention uses a combination of three or more primary variables to start the process. All history and inventory variables are queried at regular intervals and stored in a central repository for batch processing with filters. When a request for inventory is made, a yield algorithm starts with a base number of units (e.g., slots of advertising per hour of air time) which is set by management, such as local managers in individual radio stations in a large enterprise composed a plurality or multitude of many radio stations. A business rule is then applied to facilitate how the system can manipulate up or down the total number of commercial units per broadcast hour. Next, variables are used in the process, such as buyer history, product category, business booked to date, budgetary expectations, performance measurements such as Arbitron, Neilsen, or Traffic Audit Bureau ratings, which set the market value of the commercial units. As scenarios are built according to customer specifications, a pricing engine uses the algorithms to compute and present pricing to a customer through a selling agent.

In marked distinction to the prior art, rather than individual commercial units being presented to the selling agent, scenarios are developed based on the customer's requirements of frequency (number of times an individual listener is likely to hear the same commercial), reach (number of people that are likely to hear the commercial unit), budgetary considerations of the customer, demographic considerations (typically age brackets, for instance) and psychographic data (categories of listeners such as attorneys, laborers, ethnic groups, etc., wherein the specific group may be more likely to buy a particular good or service). Psychographic profiles are often good criteria for outdoor advertising. These scenarios provide the selling agent and customer with various combinations of units (whether radio, television, outdoor advertising or combinations thereof), generally with information about one or more of stations, demographics, station format, location, population, station performance measurements, etc. These scenarios and information are generally provided with further granularity such as broken out by time of day, important events, etc.

Additionally, the present invention utilizes filters to remove input "noise" from the yield management process. These filters basically smooth the input to reflect the real demand and avoid the affects of specious spikes in demand caused by, for instance, orders building up on a manager's desk before he or she takes time to enter the orders.

The present invention achieves these objects and goals using an enterprise inventory management system, including a performance measurement system for measuring performance of a medium in which units of inventory are used; a revenue maximization system which determines a price for said units based on predetermined pricing considerations; a central information storage system for receiving information from said performance measurement system and revenue maximization system to generate scenarios wherein various combinations of units are grouped together to meet a buyer's criteria; and a scenario planner to display the various scenarios generated by the central information storage system.

The process for inventory management comprising the steps of: a seller and a buyer identify an opportunity for purchasing units; obtaining the history of the buyer with respect to purchases of like units, if any; receiving from the buyer information about the buyer's purchase requirements; obtaining available inventory information; obtaining prices for said units from a revenue maximization system; and generating at least one scenario comprising a plurality of units based on said information obtained from said buyer, wherein said at least one scenario meets the buyers demands and reflects said available inventory and said prices.

The method of providing various scenarios to a purchaser of units of opportunities to advertise, comprises permitting a buyer to select various markets by geographic demarcation; selecting various markets within said geographic demarcation; set appropriate filters to filter out media within the selected markets using criteria selected from a group consisting of demographics, psycho-graphics or media type; inputting buyer criteria according to at least two of following criteria: the number of persons expected to be exposed to said units, the frequency of those persons seeing said units, budget for purchase of the units, demographics, psycho graphics, gross number of times people will be exposed to said units; and compiling a scenario composed of a variety of said units based on buyer criteria.

BRIEF DESCRIPTION OF THE DRAWINGS

The present invention will now be described by way of exemplary embodiments shown in the various figures, to which it is not limited. Throughout the figures, like elements will be labeled with identical or similar reference numbers.

FIG. 8 is an exemplary table of daily and weekly totals for a given number of units.

DETAILED DESCRIPTION OF PREFERRED EMBODIMENTS

Figure 1:
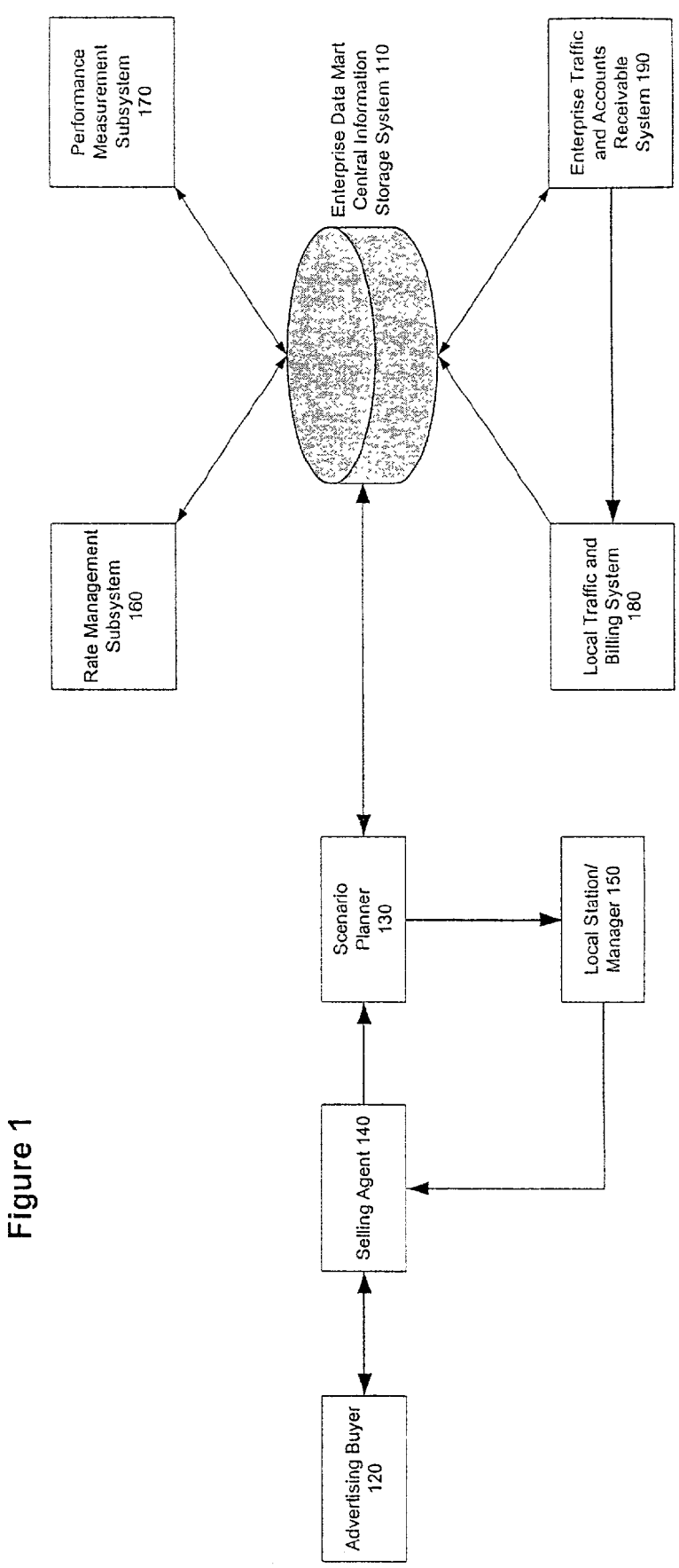
FIG. 1 illustrates an inventory management system in accordance with the present invention.

1) System Overview of Enterprise Inventory Management System (FIG. 1)

The enterprise management system and method provide for bundling a radio, TV, outdoor advertisements and entertainment inventory to achieve maximum revenue of these perishable products. What is presented to the selling agent 140, or directly to the advertising buyer 120, are a series of scenarios wherein groups of units are presented and annotated with various supplemental information. For instance, this supplemental information can include station identification with hyperlinks to additional information about the station, location or other marketplace identification, population, reach, performance measurements, price, demographics, psycho-graphics, number of units, frequency. The various selected information can be segregated by time of day, day of week, month, etc. Important media events, such as sports events, can also be displayed. Whatever information is generally of interest to sellers and buyers can be presented as part of the scenarios.

The selling agent 140 can present these scenarios to the buyer 120 during negotiations for selection by the buyer 120. In this way the seller 140 is given options in the form of different combinations of radio airtimes, TV commercial times, outdoor advertising and combinations thereof, for instance, that satisfy the buyer's 120 requirements. The system can also be a self-service system particularly if the sellers 140 are perceived as not adding sufficient value to the over all system and users experience.

The buyer 120 typically specifies the budget for the advertisement campaign, the desired range or number of people who will hear the advertisement, the frequency any one person is likely to hear the same advertisement, as well as demographics, psycho-graphics or other factors which tend to identify market penetration. The buyer 120 may not be as interested in or concerned about the precise times, shows, market segments, locations, etc. the advertisements appear as he or she is in the overall effect (e.g., frequency, reach, demographics and price) particularly if advertising on a national scale. Hence, revenue can be maximized by selecting inventory that otherwise might go unsold but fit the buyer's criteria. The system will also allow a buyer 120 to select particular times, shows, locations, etc. to build various scenarios if the buyer 120 has preferences or requirements in this regard.

Figure 6:
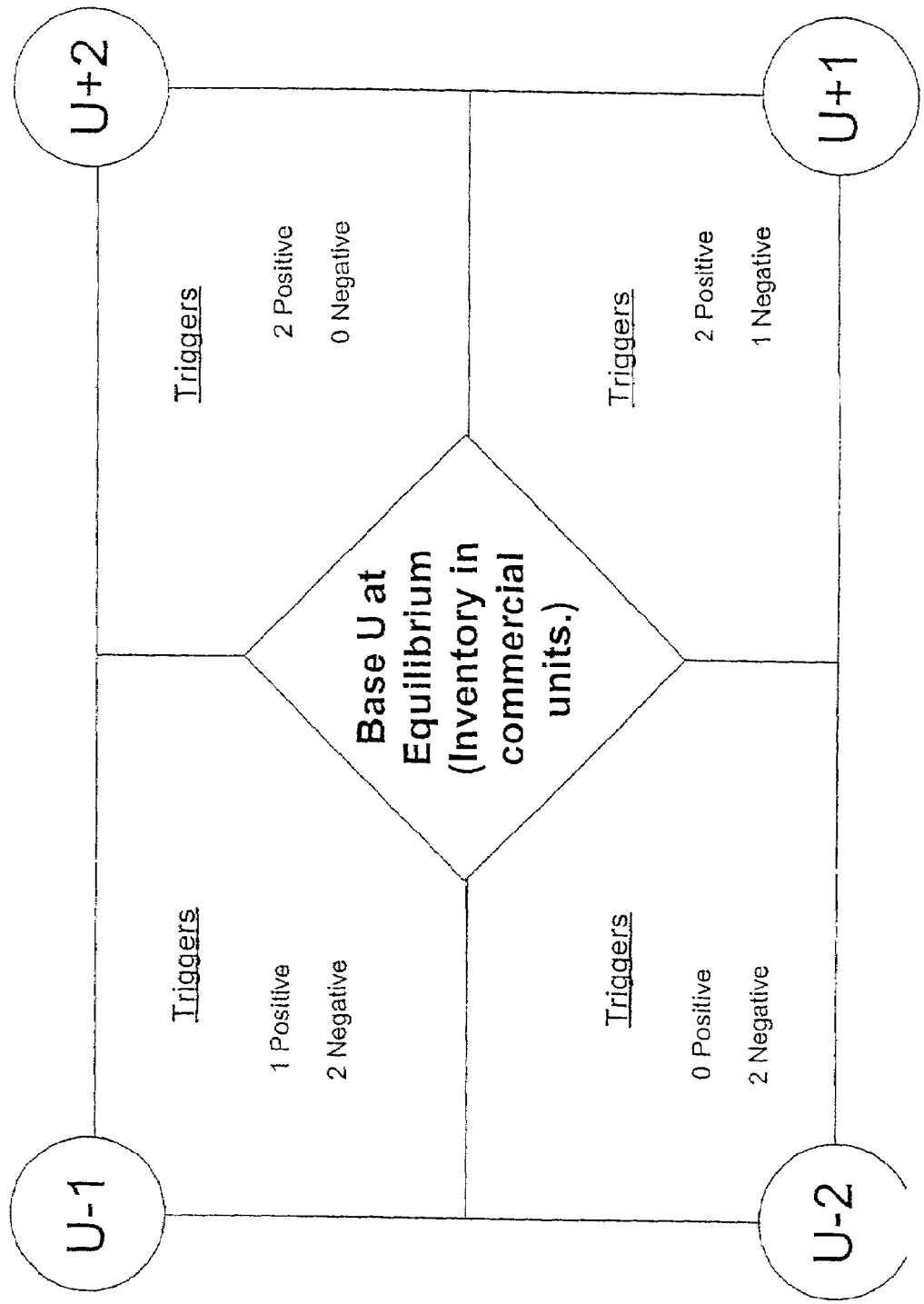
FIG. 6 is a matrix showing an example of when to increase or decrease the number of units from a baseline set by management.

An electronic central information storage system 110 collects influencing factors for the probability and price sensitivity of a particular advertising buyer 120. The central information storage system 110 also collects business rules for inventory scaling (increasing or decreasing the number of units in response to demand), available inventory to sell, budgetary goal information, advertiser payment history (e.g., indications on what the buyer has been willing to pay in the past, promptness of payment, collection problems, and any other factor which tend to indicate the price sensitivity of the buyer and/or the cost of doing business with the buyer). Station performance data (e.g., Arbitron ratings for radio, Nielsen ratings for television, Traffic Audit Bureau for outdoor advertising, or any other appropriate performance measurement service or system) is fed to a scenario planner 130 to be presented to the advertising customer 120 through a seller 140. The inventory is scaled to reflect changes in perceived demand and/or rate of increasing demand by, e.g., increasing the number of units in a period of time when demand seems to be high or increasing and decreasing inventory when demand is perceived to be below from a baseline. FIG. 6 is a matrix showing when to increase or decrease the number of units from a baseline set by management. Naturally, there are limits on how many units can be added (measured, for instance, by downward changes in performance measurements) and on how many should be cut (budgetary restraints versus increased performance measurements for example). In areas other than selling advertising opportunities, the inventory can be scaled in a physical sense. For instance, this aspect of the present invention can be used to change the number of seats available on a give flight route at a given time by changing the number of seats on a plane or changing the plane type or model to change the number of seats, or more planes can be used for a given route, etc. Similar concepts apply to the number of berths on a ship, etc.

In some embodiments as shown in FIG. 1, output of the scenario planner 130 is reviewed by a local station manager 150 before the seller 140 is authorized to present the various scenarios to an advertising buyer 120, although this review process and communication with the manager 150 can be omitted for pre-approved scenarios or altogether. The scenario planner 130 establishes a two-way communication with the enterprise central information storage system 110 and to the performance measurement system 170, although the performance measurement information can also be obtained through the enterprise central information storage system 110. Once three or more variables exist, inventory and pricing fuzzy logic algorithms creates scenario plans to present the most profitable bundle of offerings via the scenario planner 130, through the local station manager 150 and the seller 140 to the advertising buyer 120. Even where the scenarios are typically pre-approved, it may still be appropriate to present them to the local business units 150 for detection of abnormalities.

Once processed by the local business units, e.g., the local station manager 150, they are presented to the advertising buyer 120. Negotiations typically take place as explained below with reference to FIG. 4 (described in greater detail below). The main systems that interact to build these scenarios are the enterprise central information storage system 110, which receives and transmits data to the revenue maximization system 160, the performance measurement system 170 and the enterprise traffic and accounts receivable system 180. The enterprise traffic and accounts receivable system 180 provides information to the local traffic and billing systems for periods of limited duration such as twelve weeks or even two years. The local traffic and billing systems 190 then provide information to the enterprise central information storage system 110 for updating the algorithms used to determine price. The specific algorithms can change from time to time and are generally optimized with experience and objective measures.

A business rules engine in the central information storage system 110 provides the local rule definitions for scaling inventory and price to provide the most profitable combination.

Scaling inventory is a multi-step process. The enterprise central information storage system 110, for instance, tracks six quantities on a day part basis. These six quantities are spots sold-to-date Sd, forecasted spots sold Sf, maximum/beginning inventory Sm, revenue-to-date Rd, forecasted revenue Rf, and projected revenue at maximum sell-out Rm. These quantities can be summed over a calendar month to get monthly totals. If the date of inquiry is within the same calendar month, then some day parts will already be in the past. It is convenient to discard this "spoiled inventory," which of course can no longer be sold, from the maximium/beginning inventory Sm and from the projected revenue at maximum sell-out Rm. Hence, at any point in the month, the maximum/beginning inventory is at the maximum inventory that could be sold and the projected revenue at a maximum sell-out Rm is the projected revenue at its maximum sell-out existing at the time of inquiry.

With these criteria in mind, it should be noted that the following are always true: the spots sold-to-date Sd are equal to or less than the forecasted spots sold Sf, and less than or equal to the maximum/beginning inventory Sm ($Sd \leq Sf \leq Sm$) and the revenue-to-date Rd is less than or equal to the forecasted revenue Rf, which is less than or equal to the projected revenue at maximum sell-out Rm ($Rd \leq Rf \leq Rm$).

There are four cases that should be considered. In case 1, revenue-to-date is greater than or equal to the budget ($Rd \geq Budget$). If the budget has already been made, it is no longer possible to change the percent of inventory that is to be used to make the budget. However, the system can still find the percent of inventory sold when budget was made, by doing a binary search of the enterprise central information system storage system 110 for the day on which the estimated revenue exceeded budget. This can facilitate future planning and adjustment of the total inventory for pricing of the budget.

In the second case, the revenue-to-date Rd is less than the budget and (Rd<Budget) and the budget is less than or equal to the forecasted revenue Rf (Budget≦Rf), or the revenue-to-date is less than the forecasted revenue Rf and forecasted revenue Rf is equal to the projected revenue Rd at maximum sell-out Rm, (Rd<Rf and Rf=Rm). In this case, the system can estimate ratio of inventory to budget as follows $$InventoryToBudget = ((Sf-Sd)/(Rf-Rd)) \times (Budget-Rd) + Sd.$$

The percent inventory to budget is 100 times the inventory to budget divided by the total number monthly beginning inventory.

In case 3, the forecasted revenue Rf is less than the budget and forecasted revenue Rf is also less than the projected revenue at maximum sell-out Rm, (Rf<budget and RF<Rm). In this case, the system can estimate inventory to budget as follows:

$$InventoryToBudget = ((Sm-Sf)/(Rm-Rf)) \times (Budget-Rf) + Sf.$$

In the fourth case, the forecasted revenue Rf is less than budget and the revenue-to-date Rd is equal to the forecasted revenue Rf and the revenue at maximum sell-out Rm, (Rf<budget and Rd=Rf=Rm). In this case, the inventory must be sold without making budget. It is still possible to estimate that inventory would have been needed with the following equation.

$$InventoryToBudget = (Sm/Rm) \times Budget$$

With these numbers, it is possible to define a new percent inventory to budget. For instance, if it is desired to define a new value for the inventory to budget, than the system can do so by scaling rates for all remaining inventory that is un-sold and un-spoiled. This is possible if the estimated revenue-to-date is less than budget in a preferred embodiment of the present invention.

The system can compute the scale factor as follows. First compute the inventory to budget by using the new desired percent inventory to budget and beginning inventory, i.e., InventorytoBudget=(PctInventorytoBudget)(BeginningInventory)/100. There are four cases to consider under this scenario. In case one, the inventory to budget is less than or equal to the spots sold-to-date (InventorytoBudget≦Sd). In this case, an error has occurred insofar as the system indicates that there is a desire to make budget without selling anymore spots or by returning spots that have already sold. In case two, the spots sold-to-date is less than the inventory to budget and the inventory to budget is less than or equal to the forecasted spots sold, or the spots sold-to-date is less than the forecasted spots sold and the forecasted spots sold is equal to the maximum/beginning inventory (Sd<InventoryToBudget) and ((InventoryToBudget≦Sf) or (Sd<Sf and Sf=Sm)). In this case, the scale factors computed as follows:

$$Scale\ Factor = (Budget-Rd)(Sf-Sd)/(Rf-Rd)(InventoryToBudget-Sd).$$

In the third case, if forecasted spots sold is less than the inventory to budget and the forecasted spots sold is less than the maximum/beginning inventory (Sf<InventoryToBudget) and (Sf<Sm). In this case, scale factors computed using the following:

$$Scale\ factor = (Budget-Rd)(Sm-Sf)/(Rm-Rf)(InventoryToBudget-Sf) + (Sm-Sf)(Rf-Rd).$$

Figure 2:
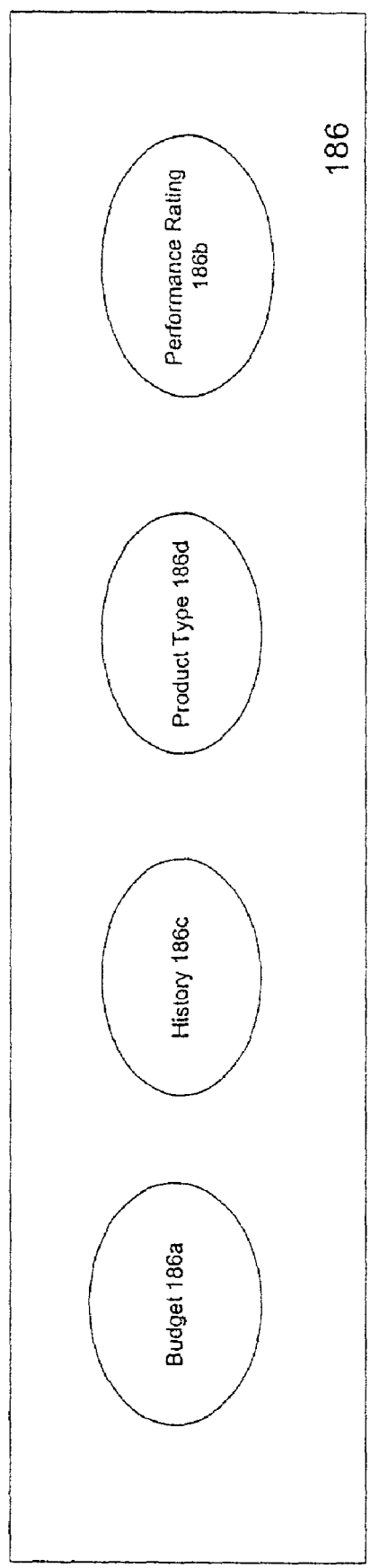
FIG. 2 shows details of the local traffic and billing system illustrated in FIG. 1.

In the fourth case, the forecasted spots sold is less than the inventory to budget and the spots sold-to-date is equal to the forecasted spots sold which equal to maximum/beginning inventory ((Sf>InventoryToBudget) and (Sd=Sf=Sm)). In this case, the inventory is sold out and the system should return an error message. At this point, the system scales the rates of all available (unspoiled) inventory in the time period by the scale factor that was just computed.

a) Traffic and Accounts Receivable System 190 (FIG. 2)

As illustrated in FIG. 2, the traffic and accounts receivable system 190 in each station, and the enterprise traffic and accounts receivable system 180 includes connections to a selling agent 182 (140 in FIG. 1), various accounts receivable software 184, and the pricing functions 186 which are typically downloaded or accessed through the enterprise central information storage system 110. The pricing functions 186 optimally include budgetary goals 186a, performance measurements 186b (e.g., Arbitron, Neilsen ratings, and Traffic Audit Bureau) for various programs or outdoor advertisements, payment history and price sensitivity of an individual or category of customer or advertiser 186c and product type 186d. Product type 186d is important since some industries are willing to pay more for acquiring inventory units, i.e., some industries have less price sensitivity than others. This information is sent in the central information storage system 110 for processing via the business rules engine to provide the local rule definitions for scaling inventory and price to provide for the most profitable combination or scenario of advertising time.

An advantage of this system is that a customer typically comes to the purveyor of the inventory, such as a TV or radio station, with the desire for his advertisement to be heard a given frequency of times by each listener or viewers, a given number listeners or viewers customers (reach) and to a given demographic or psycho graphic of the consuming public. The present invention recognizes, unlike previous systems, that the customer may not be the best informed or even be concerned about what program his advertisement appears on, provided that his or her commercial is heard and/or seen by the proper listeners or viewers of a given reach a given number of times in a given interval.

The present invention facilitates the customer's desire by utilizing the performance measurements for the number of listening or viewing public that listens to and/or views a particular show in a particular time frame. It also analyzes the product type to determine whether the given advertised product has a particular repetition frequency that is optimal or a particular demographic.

Figure 3:
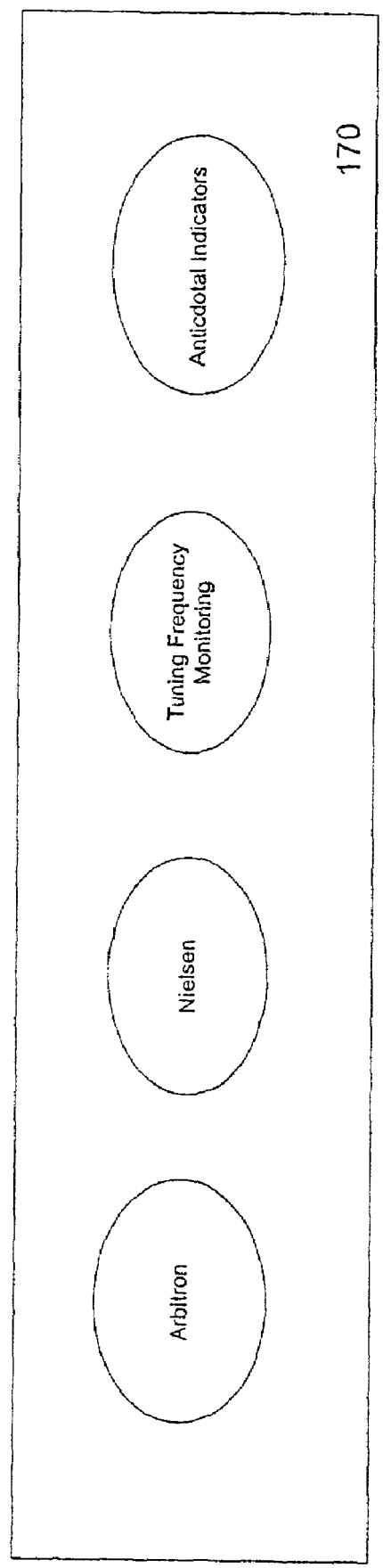
FIG. 3 illustrates the optional components of the performance measurement system shown in FIG. 1.

Additionally, revenue management is improved by evaluating the history of the buyer 120 to determine their payment history, in particular. Slow paying buyers 120 are not worth as much as buyers who pay promptly. Accordingly, buyers 120 that tend to have poor payment histories and infrequent buyers 120 from the inventory management system are priced differently than buyers 120 that pay promptly and/or who are frequent buyers. Also, the history of the buyer 120 indicates the buyer price sensitivity by showing what he or she has been willing to pay, and perhaps more importantly, what he or she has been unwilling to pay. Hence, the history of the buyer 186c is utilized as part of the pricing function 186. Additionally, each local station has a budgetary goal 186d which is set by management. The present inventory management system determines how many units of advertising must be sold at what rate and at what time to achieve such a goal which establishes a base line. The inventory management system varies the number of units from this base line to meet or exceed this goal without unduly adversely affecting performance, for instance. Hence, the budgetary considerations not only form a starting point, but are utilized throughout the process such that the budget can be achieved.

b) Performance Measurement System 170 (FIG. 3)

The performance measurement system 170 shown in FIG. 3 can be of any form which gives a measure of the extent of the audience. Surveys are used by Nielsen and Arbitron rating services, for instance. It is also possible to detect the turning frequencies of passing cars to survey the extent of the audience for radio stations. Nielsen ratings uses set-top boxes to monitor channel selection and TV viewer ship of cross-sections of the audience. Internet listener ship can be easily tracked. Anecdotal indicators, such as listener call-in frequency, and countless other mechanisms for tracking the performance of a business unit 150, can be used. This information can be provided directly to the scenario planners 130 and the rate management subsystem 160, in addition to the enterprise central information storage system 110.

c) Revenue Maximization System 180

The revenue maximization system 180 such as shown in FIG. 3 utilizes algorithms, as explained above, to take into consideration the station's budget 186a, the performance measurements 186b, the history of the customer 186c and the product type 186d in determining at what price the advertising time should be sold. While traditional aspects are used, such as increasing price as inventory diminishes as the inventory nears performance, other factors such as the customer history 186c, measured performance of the show 186b and product type 186d are utilized to impact pricing, in addition to the station's budget.

Hence yield management is achieved with the following functions: sellout forecasting, revenue forecasting, fuzzy rules and pricing adjustment. With respect to sellout forecasting, the central information storage or data mart 110 will provide rate management system 160 with units sold and beginning inventory for a number of days. This information is filtered to remove noise and used to compute the current sell pace, using the process shown in FIG. 4. The sellout to date and sell pace are combined with historical data to estimate the sellout forecast.

With respect to revenue forecasting, the revenue maximization system 160 stores a price for each unit of inventory. To compute a revenue forecast, the revenue maximization system 160 will sum all of the prices from the first spot up to the forecasted sellout. It will also provide actual revenue on a weekly basis but this will arrive after the week is over and thus it will be too late to utilize as a forecasting aid.

The output of fuzzy rules is a determination of whether the current prices are too high, too low or just right. The input is composed of two fuzzy measurements: (a) forecasted revenue compared to the monthly budget and (b) the rate of change of the forecasted revenue. The fuzzy rules are generally as follows: The price is "low" and must be raised when the forecasted revenue is increasing, and the price is "high" and must be lowered when the forecasted revenue is decreasing and the forecast is lower than the budget and the forecasted is not increasing.

With respect to pricing adjustment, if the price is deemed too low or two high then the price is adjusted once a day (or other suitable time period) to correct the problem. The size and type of correction is determined by the user. The type of correction can be either a percent correction or an absolute dollar correction. For example the user can select values so that strong demand causes a $5 increment and weak demand causes a 2% decrement in rates for remaining inventory to give but one of many combinations of possible types of adjustments.

Figure 4:
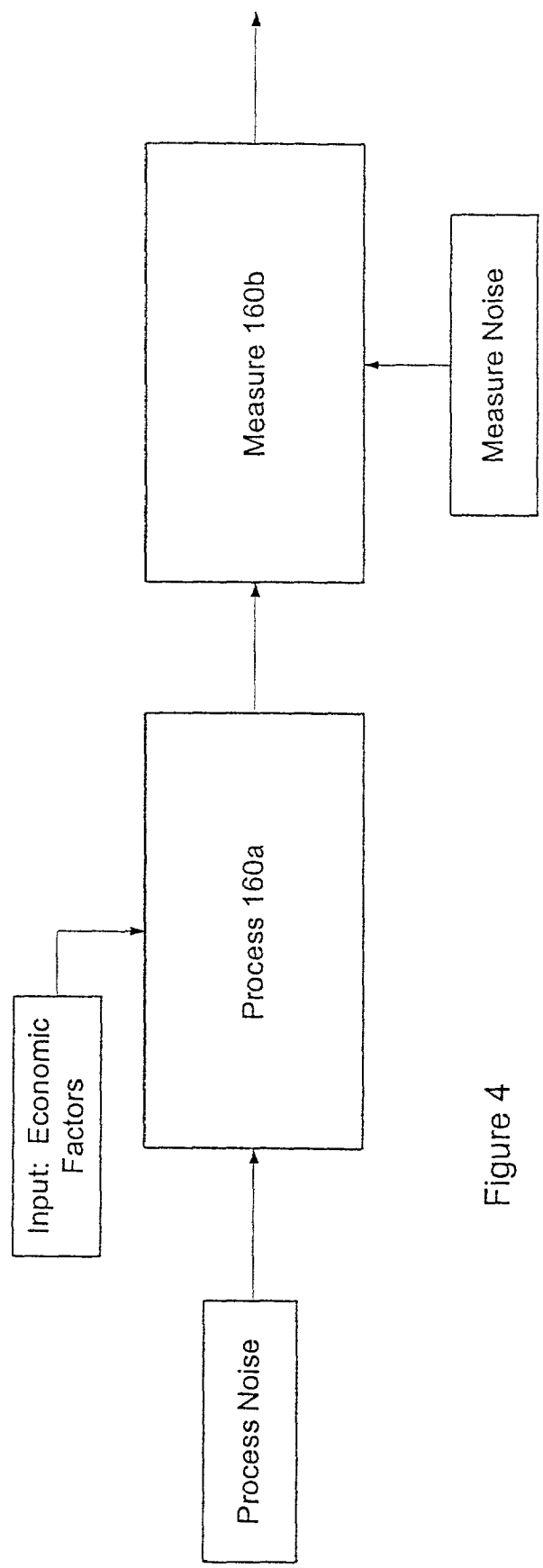
FIG. 4 illustrates the input information filtering process.

FIG. 4 shows a process diagram for obtaining accurate results in the revenue maximization system 160. The input of the process includes economic factors that influence demand, such as Miler Kaplan Market buying data and the Consumer Price Index (CPI). This type of input is another variable used in the pricing algorithm which affects the budget data by forecasting up and forecasting down budgets Process noise is due to adverting buyers buying spots in both discrete and random manners. The output of the process 160a is the state of the current sellout and sellout pace. For an accurate measure in the measure processes 160b, measure noise also has to be considered. Measure noise is caused, for example, by orders sitting on the desks of managers, etc. until the end of a period (e.g., the week) and then entered into the system, or the traffic system moves spots from one day part to another (e.g., morning to afternoon). The measurement is the current sellout read from the traffic systems 180, 190 via the scenario planner 130.

The filter requirements in the process diagram of FIG. 4 include that the filter be able to remove high frequency noise such as orders collecting on desks to be entered all at once. The filter can be a low-pass filter which ignores or attenuates frequencies of one cycle per week or higher. The filter should also be causal, since it cannot use future (and therefore unavailable) data to derive a current estimate. The filter has to be unbiased and without lag in the output. For example the filter can be a finite impulse response filter using for example a 20 sample response such as sinc filter $\mathrm{Sin}(\omega x)/x$ where $\omega=0.33$. There are several ways the filtered data can be used to project the final sellout. It can be on one or more of the following criteria (1) on the basis of sellout to date compared to current time frame historical sellout added to final historical sellout, (2) by historical increments added to the sellout to date, and/or (3) by trend projections to final without regard to historical data.

The filtering is accomplished with the use of a filter kernel which is used to remove the measurement noise from various input signals. If k[i] denotes the filter kernel where $0 \leq i \leq 19$, the filter kernel can be computed once and stored for use in future filter iterations. This filter kernel is computed as follows:

Let $\omega=0.33$ and $t[i]=\sin(\omega i)/i$ for all $0<i\leq 19$. Further, let $t[0]=\omega$ Then, let $$k[i] = \frac{t[i]}{\sum_{i=0}^{19} t[i]}$$

Prefiltering on an input folder x[i] where $x \geq 1$ and assumed that it is indexed so that the more recent measurements occur with the lower values of i, then the higher values of i indicate earlier measurements up to the first measurement x[n]. If there are missing data values or dropped to 0 in the input screen than the input is prefiltered by replacing the missing values or 0 values with at least one good value. This should be repeated for up to 7 data values, in at least one preferred embodiment of the present invention. For example:

| Index    | 0 | 1 | 2 | 3 | 4 | 5 | 6 | 7 | ... |
|----------|---|---|---|---|---|---|---|---|-----|
| Input    | 6 | 5 | 0 | 0 | 0 | 3 | 2 | 1 | ... |
| Pre-Filt | 6 | 5 | 3 | 3 | 3 | 3 | 2 | 1 | ... |

After, e.g., seven missing or zero values this pre-filtering should end and future zeros should be allowed into the main filter formula. This allows for the possibility that a manager has designated a time period (a day or day part) as commercial free without skewing the filter too much.

The main filter formula can now be defined as follows:

$$\text{Filt}(x)[i] = \left(\sum_{j=i}^{i+19} x[j]k[j-i]\right) \begin{array}{l} x[i] \text{ if } i > n-19 \\ \text{ if } i \leq n-19 \end{array}$$

The basic approach can be expressed as follows:
step (1) find the filtered historical final average number of spots sold for a given day part;
step (2) find the filtered historical average number of spots sold for that day part at the current number of lead days;
step (3) determine the tentative forecast as the current sellout minus the value of step (2) minus the value of step (1);
step (4) determine the final forecast as the value of step (3) limited to at least the current sell-out and at most the quantity sold. The result of step (4) is summed over all day parts in the range.

d) Enterprise Central Information Storage System or Data Mart 110

The enterprise central information storage system or datamart 110 is the hub of information which gathers data from the rate management system 160, the performance measurement system 170, the enterprise traffic and accounts receivable system 180, as well as the local traffic and billing system 190. This information is downloaded in batches and algorithms generated using a neural network, for example, to improve accuracy over time.

e) Scenario Planner 130

Rather than present advertising units one at a time, or in groups which match the customer's budget and other criteria and desired air time, the present invention will receive information about the customer's budget and design a scenario by the scenario planner 130 to present the customer 120 with a list of all units and additional information which meet the buyer's 120 budget as well as desire for the number of times a given listener hears or sees the commercial the reach of the station, and the compatible demographics for the given advertised product or other criteria, for example.

Figure 5:
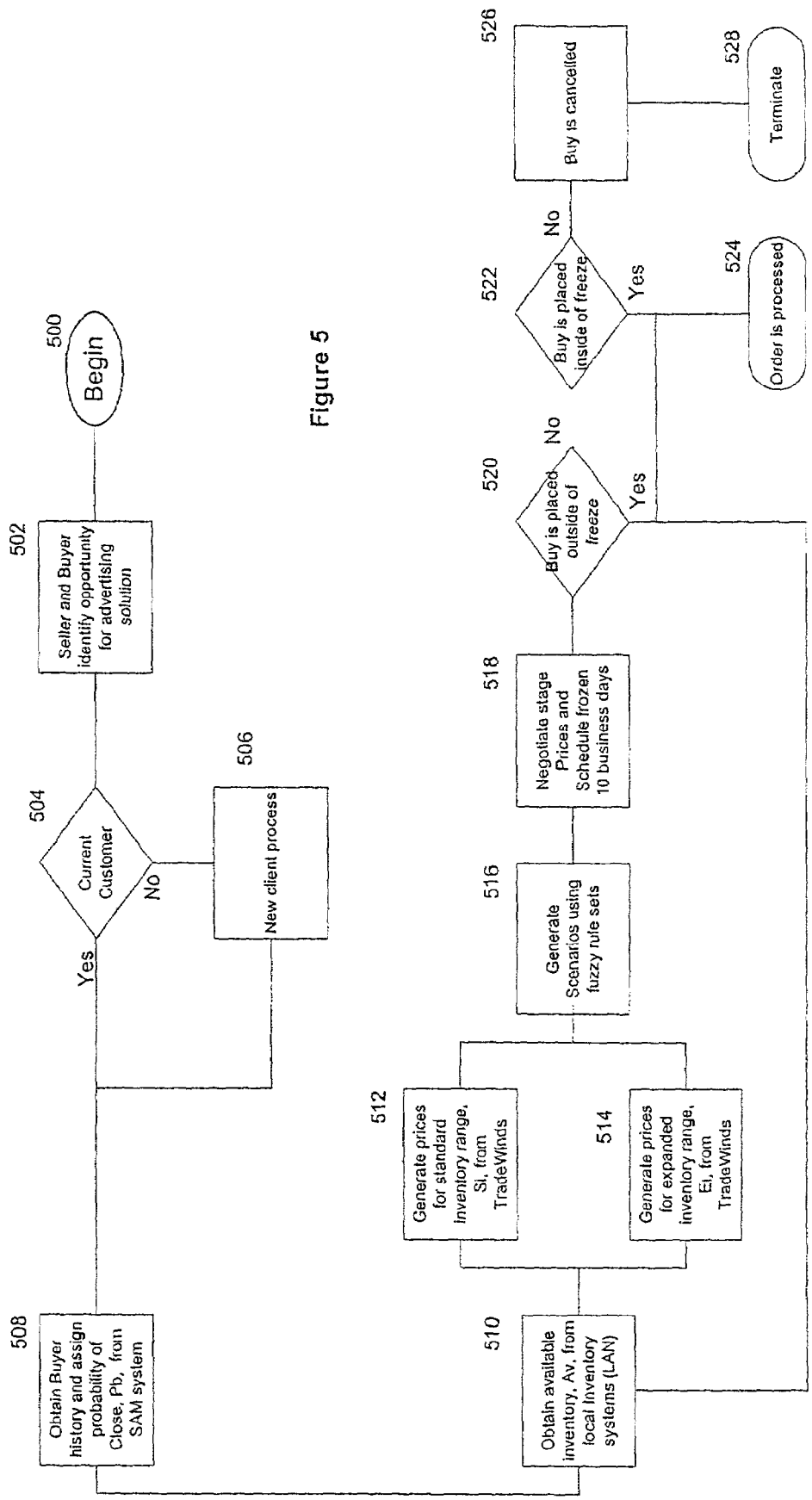
FIG. 5 illustrates the process for the enterprise management system.

2) Process for Enterprise Management System (FIG. 5)

The process for the enterprise management system shown in FIG. 5 begins (step 500) with the seller 130 and buyer 120 identifying an opportunity for advertising at step 502. If the customer or buyer 120 is a current customer, at step 504, the process proceeds to obtaining the buyer history and calculating and assigning a probability that the buyer will close on the deal from the enterprise account management system, as shown in step 508. However, if the customer 120 is determined at step 504 to be a new customer, then the new customer is processed in step 506 to gather information about the customer, including such information as contact information, types of products being sold, the types of advertisement that are to be aired, credit ratings and/or history, etc.

After step 508, the system obtains available inventory information (AV) from the local enterprise traffic and accounts receivable systems 180, as shown in step 510. Thereafter, either the system generates prices for standard inventory range (SI) from the revenue maximization system 160 as shown in step 512, or in the alternative, generates prices for expanded inventory range (EI) from the revenue maximization system 160 at step 514. Thereafter, at step 516, scenarios are generated using fuzzy rule sets. At step 518, the prices and schedule are negotiated. To permit time for negotiation, at step 520 the prices and schedules in the scenarios are typically frozen for a period of time, such as ten calendar days. At step 520, it is determined whether the purchase is placed outside the freeze period, and if so, the process returns to obtain inventory from the local inventory management system at step 510. If the purchase is not placed outside the period in which the schedule is frozen, then process proceeds to step 522 where it is determined whether the purchase is placed inside the freeze period. If it has been placed inside the freeze period, then the order is processed, at step 524. If it is not placed within the freeze period, as determined at step 522, the purchase is canceled at step 526 and the process terminates at step 528.

Figure 7:
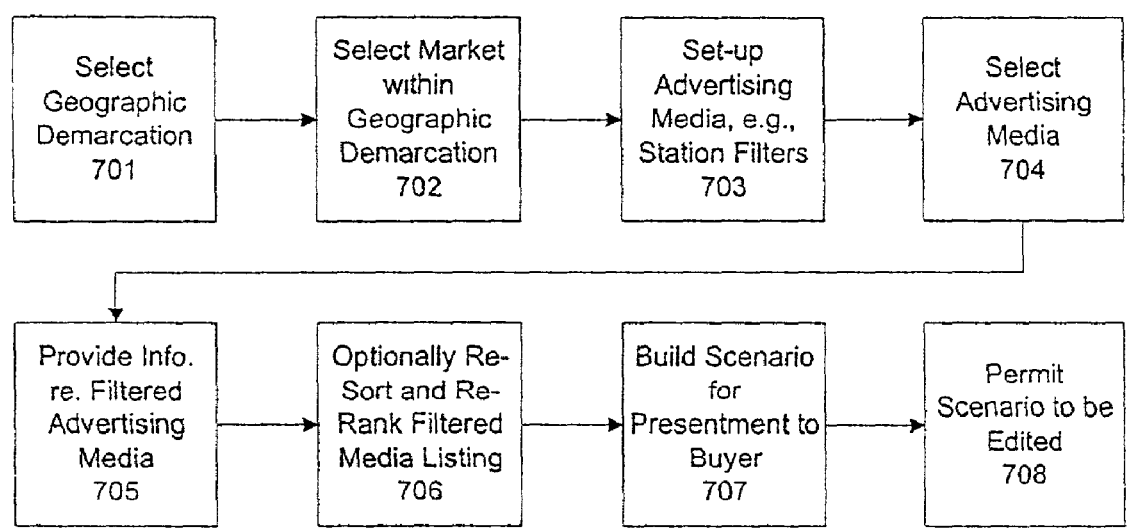
FIG. 7 illustrates an exemplary process flow of the scenario planner.

3) Exemplary Scenario Planner Process (FIG. 7)

To facilitate an understanding of the functionality of the enterprise inventory management system, functionality as viewed through the scenario planner screen shots and process flow will be explained with reference to FIG. 7. After entering into the appropriate location on a network, such as the Internet, an extended intranet such as a virtual private network or a closed intranet, the seller 140 is prompted to begin selecting various markets (Step 701), generally by state in the U.S., but any geographic demarcation might be acceptable. For instance, a computer screen can display a map of the U.S. and permit a selection of various states via clicking on cursor locations on the map. Once the states are selected, the various markets within the states and adjacent states are displayed for selection (Step 702). For instance, Florida markets may include Albany, Ga.; Dothan and Ft. Myers-Naples, Fla. etc. Through simple graphic user interface checkboxes or other appropriate mechanisms, the various markets are either selected or excluded.

The screen displayed to the seller 140 can include graphics to illustrate progress through the process of developing a scenario, this process including customer search to locate the customer information or input relevant information for new customers, customer selection via the index of current and new customers, proposal setup, and station filters, for example.

Next, appropriate filters are set up (Step 703). For example, radio station filters operate, for instance, by identifying primary, secondary and tertiary demographics. For instance, the primary demographics can include both men and women in the age bracket of 25 to 54, with the secondary and tertiary demographics being exclusive to men and women, respectively, for instance. This might be appropriate for restaurants catering to a specific demographic, for instance. By this mechanism, various radio stations that do not appeal to the demographic selected by the buyer 120 would be excluded from further selection.

Thereafter, station selection is prompted (Step 704) and, from the market list previously identified, such as Florida, Ohio and Pennsylvania, each individual market is then explored (Step 705). A filtered list for a given geographic demarcation, such as Florida, is then provided to the seller 140. For instance, after selecting Florida, the seller can look at the Miami-Ft. Lauderdale market. The seller can input a gross number of stations he may wish to look at in the Miami-Ft. Lauderdale market, which are then listed. Various stations can be listed to include various statistics regarding its audience by the primary, secondary and tertiary demographics, as well as identifying the format of the station (e.g., urban contemporary, adult contemporary, Spanish topical, etc.). Of course, the station identification is listed and hyperlinks can be provided to information about the stations as well as performance measurement information. Other stations in the geographic market may be listed even though they have been filtered out as not compatible with the selection of demographics in case there is some exceptional reason for choosing one of these stations. The large number of stations fitting the demographics is then resorted and re-ranked according to whatever criteria in which the seller 140 is currently interested (Step 706). Hyperlinks, for instance, can connect to a station information page which identifies various aspects about the station, such as call letters, various contact information, various demographics or psycho-graphics, geographic location, and other marketing information.

Additionally, the information can include current inventory and rate information. For instance, for a given station, cross-market rates are provided and show demarcations between morning, midday, afternoon, evening and overnight segments, including the number of units available and the current rates for those units. The information is generally presented in a table with date information on one axis and time information on the other axis with the rest of the information appearing in the cells of the table, and perhaps color coded for clarity and information density. Naturally, any future date can be selected. The inventory management system will display the rates generated by the revenue management system 160 as conveyed through the enterprise central information storage system 110. These rates will be for the current year and even the following year, for instance.

Thereafter, various other geographic markets can be selected using the same procedure until all desired stations in all desired markets have been selected.

Based on this information, a cross-market schedule or scenario for a customer, given the customer's desire for a particular demographic for instance, is built (Step 707). The schedule includes information including the reach, on a weekly or all weeks basis, the frequency on a current week or all weeks basis, the gross number of impressions (reach times frequency), as well as other rate information and ultimately the price. Additionally, a table is set up for the customer 120 or seller 140 to enter the number of units on a given day in a given time frame.

For instance, gross impressions indicates the efficiencies of particular units, such as the AM time slot on a summer Monday, which may be significantly different than a Friday afternoon time slot during the winter. A selected schedule of slots for a given day can be applied across the week, and across all weeks of interest, or different schedules can be designed for each day and each week. As various markets and radio stations, for instance, are selected and time slots designated, the overall reach, frequency and gross impressions can be provided to the customer as a measure of the efficiency of the selections. Thereafter, a summary of the information is provided by identification of the station, their required fees, the number of units requested, the gross price, as well as providing an opportunity for the buyer 120 and seller 140 to deselect various stations or add various stations or markets (Step 708).

Hence, it can be seen that scenarios are built first by choosing geographic locations, choosing markets within those geographic locations, filtering out stations that are inappropriate for the selected demographics of the advertisement buyer 120, identifying appropriate locations for slots using performance measurements such as reach and frequency, as well as gross impressions and thereafter providing a price on a station-by-station basis, market-by-market basis, or by geographical location, or any combination thereof.

As should be apparent from the foregoing description, advertising buyers 120 who use market definitions encompassing various media markets easily select scenarios where key factors such as reach and frequency can be maximized for a given budget. This facilitates the sale of these units, which can be beneficial to revenue maximization insofar as units that may otherwise go unsold will be sold and all units sold at optimal prices. Also, certain percentages of units can be withheld from sale in one time frame so that the withheld units can be sold later at a higher price. Additionally, there may be opportunities where a single station serves more than one geographical market, for which the present enterprise inventory management system would facilitate the identification thereof.

As management tools, the inventory management system identifies monetary data regarding each individual station, or of all stations collectively. This information can be used as budgetary information, management performance, and planning purposes.

The revenue maximization system 160 takes the information and the scenarios, whether reserved with an appropriate weight assigned to the scenario, or ordered by the buyer 120, to calculate the price of various time slots. For instance, the revenue maximization system 160 is designed to offer the right price for the right customer at the right time. It presents information in table form, such as calendar form, where the days and time segments during the day are listed. Within each cell in the table, the price, remaining inventory, total inventory and percent sold can be explained in a meaningful fashion. Daily and weekly totals for given time slots, as well as overall weekly totals, can be provided in the same graphic display. An example of such a table is shown in FIG. 8.

4) Enterprise Level Data Mining

At the enterprise level, various information can be mined from the central storage system 110. For instance, for any given calendar month or day, the budget, the forecast in meeting that budget, the revenue-to-date and the percent of budget, can be displayed by station manager or by individual salesperson. The granularity of the information can be on a monthly basis, weekly basis, daily basis, or even time frame during a day basis. Additionally, information regarding individual salespeople, managers, radio stations, geographic locations and markets can be displayed in tabular form to review the success rate of the yield. For instance, various stations within a geographic location can be listed adjacent numbers indicating the calendar budget, the forecast in meeting that budget, the current revenue-to-date and percent of budget, the inventory both sold and projected, and when inventory is projected to sell-out, as well as the number of unsold available units. The revenue factors also provided for both the current and budget to identify the success of the yield management system and the salespeople. The amount of money either exceeding budget or below budget can be indicated, as well as other information in any appropriate format. Naturally, the information can be presented in various formats, such as by station, by calendar segments for a geographic location or across the entire enterprise, for instance. The current demand rates can be easily displayed on segment of daily, weekly and monthly bases, indicating whether they are considered high, normal or low, as well as the actual rate, again in proper graphic and tabular form.

The following information for each month in the year can be used to compute changes in the budget.

| Calendar | Intersection | Broadcast |
|---|---|---|
| Budget (cB) | Rev. To Date (iRd) | Spots Sold-to-date (bSd) |
| Forecast Rev (cRf) | Forecasted Rev. (iRf) | Forecasted Spots Sold (bSf) |
| Rev To Date (cRd) | | Maximum Spots Sold (bSm = Sold + Avail) |
| | | Revenue-to-date (bRd) |
| | | Forecasted Revenue (bRf) |
| | | Maximum Revenue (bRm = Rev at bSm) |
| | | Budget (bB) |
| | | % Inventory to Budget (PctInv) |
| | | Remaining Revenue Factor (RRF) |
| | | Beginning Inventory (I) |

The intersection column above indicates that the time period is for the intersection of the calendar and broadcast months. For example the intersection for October 2001 starts on Oct. 1, 2001 and ends on Oct. 28, 2001.

Of the values above the following are actually displayed on the page (in order): cB, bB, PctInv, cRf, bRf, RRF, cRd, bRd.

When the Pct Inventory to budget for a month changes and after receiving a new value for PctInv, the following values are generally updated: cRf, iRf, bRf, bRm, RRF. Of those the following values must be redisplayed: cRf, bRf, RRF. Here are formulas (in order) which can be used to recompute these values:

$cRf=cRd+(ScaleFactor)(iRf-iRd)$ $iRf=iRd+(ScaleFactor)(iRf-iRd)$ $bRf=bRd+(ScaleFactor)(bRf-bRd)$ $bRm=bRd+(ScaleFactor)(bRm-bRd);$ and $RRF'=(ScaleFactor)(RRF).$ While every listed quantity can be a floating-point number, the displayed value should generally be rounded to the nearest whole number.

When the Remaining Revenue Factor for a month changes, a new (whole number) value for RRF is obtained. The new value can be divided by the old (floating point) value of RRF. The result is the scale factor. Then the following values are then updated: PctInv, cRf, iRf, bRf, bRm. Of those, the following are redisplayed: PctInv, cRf, bRf. The following formulas (in order) can be used to recompute these values:

To recompute the PctInv as described above regarding Pct Inventory to Budget $cRf=cRd+(ScaleFactor)(iRf-iRd)$ $iRf=iRd+(ScaleFactor)(iRf-iRd)$ $bRf=bRd+(ScaleFactor)(bRf-bRd);$ and $bRm=bRd+(ScaleFactor)(bRm-bRd).$ Weekly percentages can be calculated based as the following quantities for each week in the month:
Revenue-to-date(wRd);
Forecasted Revenue(wRf);
Remaining Revenue Factor(RRF); and
Weekly Pct (# Pct).

Then for each day part in the month the system can give the following quantities:
Current Rate/Price (cP); and
Max Rate/Price (mP).

In addition the system is told the following four quantities:
budget for the year (yB);
budget for the month (mB);
yearly forecast (yRf); and
monthly forecast (mRf).

When a slider is moved, the Remaining Revenue Factor (RRF) for the week moves with the slider. Next a scale factor can be computed by dividing the current value of RRF by the prior value. Then update the Weekly, Monthly and Yearly forecasts as follows (in order):

$yRf=yRf-wRf;$ $mRf=mRf-wRf;$ $wRf=wRd+(ScaleFactor)(wRf-wRd);$ $yRf=yRf+wRf;$ and $mRf=mRf+wRf.$ In the above equations wRf is the forecast for the selected week. So it should be subscripted to select the week of the slider.

In addition all of the day part values within the selected week should change as follows:

$$cP = (ScaleFactor)cP; \text{ and}$$

$$mP = (ScaleFactor)mP.$$

Day Part Percentages

The system is generally provided with the following values for all 35 day parts in the week:
Ratings Value Pct;
Day part Value Pct;
Remaining Revenue Factor (RRF);
Revenue-to-date(Rd);
Forecasted Revenue(Rf);
Minimum Rate/Price(Pmin);
Current Rate/Price(Pcurr);
Maximum Rate/Price(Pmax); and
Spots Sold-To-Date(Sd).

In addition the system can get the Forecasted Revenue for the week (wRf).

When the Slider is moved, the remaining Revenue factor should change to track the slider. Next a scale factor can be computed by dividing the new value of by the prior value. Then the following values can be updated: Rf, Pmin, Pcurr, Pmax, and wRf.

$$wRf = wRf - Rf;$$

$$Rf = Rd + (ScaleFactor)(Rf - Rd);$$

$$wRf = wRf + Rf;$$

$$Pcurr = (ScaleFactor)Pcurr;$$

$$Pmax = (ScaleFactor)Pmax; \text{ and}$$

$$wRf = wRf - Rf.$$

Note that all values from above except wRf are specific to a day part and should be subscripted by the day part. If Spots Sold-to-date is 0 (Sd=0) then Pmin should also be updated as follows:

$$Pmin = (ScaleFactor)Pmin.$$

Availability Ranges are determined as follows:
Let I be the beginning inventory for the selected day part;
Let Sd be the number of spots sold-to-date; and
Note: Sd≦I is assumed. If that is not the case then I needs to be updated so that I=Sd.

$$\text{Let } N_i = 1 + (i-1)I/10 \text{ where } 1 \leq i \leq 11.$$

$N_i$ Represents the spot number whose price is displayed by the ith slider from the right. Let $P_i$ represent the price of spot number $N_i$.

So $P_i$ is the value displayed by the ith slider from the right.

Where JavaScript is used, the ASP code should build a JavaScript variable containing I and an array containing the 11 values of $P_i$. If there is a special range number i such that $N_i < Sd < N_{i+1}$, then the ASP code should build a JavaScript variable for the Revenue within the last partially sold range (Rr). The value of Rr can be obtained from the Sum_Rates_By_Range method of the COM object for spot numbers $N_i$ through Sd−1 inclusive. The ASP code should also build a JavaScript variable to hold the last sold spot price (Pl). The value of Pl can be obtained from the Get_Spot_Price method of the COM object.

A JavaScript function can also be made available to the client. This function should compute the Revenue by Range given the spot numbers for the endpoints of the range and the prices for those spot numbers. The Revenue by Range is just the sum of the Prices in the range assuming a straight-line price curve. The formula to sum up all of the prices within a range is $$RevByRange(Num_1, Num_2, Price_1,$$
$$Price_2 = Price_1 + (Num_2 - Num_1 - 1)\left(\frac{Price_2 + Price_1}{2}\right)$$

Where $Num_1$ is the spot number for the first spot in the range and $Num_2$ is the spot number for the next spot after the end of the range. $Price_1$ and $Price_2$ are the prices for spot number $Num_1$ and $Num_2$ respectively. Note that the formula assumes that $Num_2 > Num_1$.

When a Slider is moved, the slider will control the Rate for that spot number and indirectly it will also control all of the spots in the range to the left and the range to the right by setting the prices along straight lines.

Slider number i is allowed to move if $Sd < N_i$. Note that this means slider 11 can always move. When slider i is moved, some JavaScript code can change the price $P_i$ according to the new slider position. Next the following psuedo-code should be used.
Rem Update Range on Left
If i≦10 then
 The revenue for range i is RevByRange($N_i$, $N_{i+1}$, $P_i$, $P_{i+1}$
End if
Rem Update Range on Right
If i≧2 and $Sd > N_{1-1}$ then
 The revenue for range i−1 is Rr+RevByRange(Sd, $N_i$, Pl, $P_i$)
Else
 The revenue for range i−1 is RevByRange($N_{i-1}$, $N_i$, $P_{i-1}$, $P_i$)
End if.

Calendar Budget to Broadcast Budget Conversion is Calculated as Follows:

Definitions
Let CalBdgt[i] be the calendar budget for month number i where 1<i<12;
Let BcastBdgt[i] be the broadcast budget for month number i;
Let NumBcastWeeks[i] be the number of broadcast weeks in month number i;
Let FirstDOW[i] be the number of the day of week of the first day of calendar month number i. Monday should be represented by 1. For example if February starts on a Sunday then FirstDOW[2]=7;
Let Arb Val(k) be the Arbitron Value of the station for the day of week represented by k where 1≦k≦7. Note that 0≦ArbVal(k)≦1. If Arbitron Ratings are not used then we can define ArbVal(k)=for all 7 days of week. If special consideration needs to be given to weekends that can be done too;
Let Week[1,i] be the ratio of revenue for month i that will be achieved in the first (broadcast) week of the month. If this quantity is not known it can be set as follows:

$$Week[1,i] = 1/NumBcastWeeks[i]$$

Let G denote the annual budget growth factor in percent. So next January's budget is expected to be $(1+G/100)CalBdgt[1]$.

Common Computation

Now a boundary factor for each month is defined as follows:

$$B[i] = \text{Week}[1, i] \sum_{k=1}^{\text{FirstDOW}[i]-1} ArbVal(k)$$

The boundary factor determines the percent of the broadcast month's budget that occurs before the calendar month starts. Notice that if month i starts on Monday then FirstDOW[i]−1=0. Thus B[i]=0.

Broadcast to Calendar Computation can be carried out as follows:

CalBdgt[i]=BcastBdgt[i](1−B[i])+BcastBdgt[i+1]B[i+1]

Calendar to Broadcast Computation can be obtained as follows:

The definition of B[i] can be extended to include January of the following year. But first the growth factor G is incorporated.

$$B[13] = 1 + \frac{G}{100}\text{Week}[1, 1] \sum_{k=1}^{\text{FirstDOW}[13]-1} ArbVal(k)$$

Next the Broadcast to Calendar Matrix is defined as follows:

| 1 − B[1] | B[2] | 0 | 0 | 0 | 0 | 0 | 0 | 0 | 0 | 0 | 0 |
|---|---|---|---|---|---|---|---|---|---|---|---|
| 0 | 1 − B[2] | B[3] | 0 | 0 | 0 | 0 | 0 | 0 | 0 | 0 | 0 |
| 0 | 0 | 1 − B[3] | B[4] | 0 | 0 | 0 | 0 | 0 | 0 | 0 | 0 |
| 0 | 0 | 0 | 1 − B[4] | B[5] | 0 | 0 | 0 | 0 | 0 | 0 | 0 |
| 0 | 0 | 0 | 0 | 1 − B[5] | B[6] | 0 | 0 | 0 | 0 | 0 | 0 |
| 0 | 0 | 0 | 0 | 0 | 1 − B[6] | B[7] | 0 | 0 | 0 | 0 | 0 |
| 0 | 0 | 0 | 0 | 0 | 0 | 1 − B[7] | B[8] | 0 | 0 | 0 | 0 |
| 0 | 0 | 0 | 0 | 0 | 0 | 0 | 1 − B[8] | B[9] | 0 | 0 | 0 |
| 0 | 0 | 0 | 0 | 0 | 0 | 0 | 0 | 1 − B[9] | B[10] | 0 | 0 |
| 0 | 0 | 0 | 0 | 0 | 0 | 0 | 0 | 0 | 1 − B[10] | B[11] | 0 |
| 0 | 0 | 0 | 0 | 0 | 0 | 0 | 0 | 0 | 0 | 1 − B[11] | B[12] |
| B[13] | 0 | 0 | 0 | 0 | 0 | 0 | 0 | 0 | 0 | 0 | 1 − B[12] |

To go from Calendar to Broadcast the inverse of this matrix is computed and applied it to the calendar budgets. The following code accomplishes this:

```
Function Is_Even(X)
    If X Mod 2 = 0 Then
        Is_Even = True
    Else
        Is_Even = False
    End If
End Function
Function Cal2Bcast(i_BC_Month As Integer, Cal_Budget As Range,
First_Fraction As Range)
    Dim Cal_Index
    Dim Product_Index
    Dim Product
    Dim Sum
    Dim Det1, Det2  ' Determinant =
    Det1−Det2 where Det1=Prod(1−Fi) and
```

-continued

```
Det2=Prod(Fi)
        ' Note use First_Fraction(13) instead of First_Fraction(1)
        ' but (1−First_Fraction(13)) is not used instead of
        (1−First_Fraction(1))
    Sum = 0
    Det1 = (1 − First_Fraction(1))
    Det2 = First_Fraction(13)
    For Product_Index = 2 To 12
        Det1 = Det1 * (1 − First_Fraction(Product_Index))
        Det2 = Det2 * First_Fraction(Product_Index)
    Next Product_Index
    ' Case 1: Cal < BC
    For Cal_Index = 1 To i_BC_Month − 1
        If Is_Even(i_BC_Month + Cal_Index) Then
            Product = Cal_Budget(Cal_Index)
        Else
            Product = −Cal_Budget(Cal_Index)
        End If
        ' Case 1.1: p < = Cal < BC
        Product = Product * First_Fraction(13)
        For Product_Index = 2 To Cal_Index
            Product = Product * First_Fraction(Product_Index)
        Next Product_Index
        ' Case 1.2: Cal < p < BC
        For Product_Index = Cal_Index + 1 To i_BC_Month − 1
            Product = Product * (1 − First_Fraction(Product_Index))
        Next Product_Index
        ' Case 1.3: Cal < p = BC -- Nothing Done
        ' Case 1.4: Cal < BC < p
        For Product_Index = i_BC_Month + 1 To 12
            Product = Product * First_Fraction(Product_Index)
        Next Product_Index
        Sum = Sum + Product
    Next Cal_Index
```

-continued

```
    ' Case 2: BC < = Cal
    For Cal_Index = i_BC_Month To 12
        If Is_Even(i_BC_Month + Cal_Index) Then
            Product = Cal_Budget(Cal_Index)
        Else
            Product = −Cal_Budget(Cal_Index)
        End If
        ' Case 2.1: p < BC < = Cal
        For Product_Index = 1 To i_BC_Month − 1
            Product = Product * (1 − First_Fraction(Product_Index))
        Next Product_Index
        ' Case 2.2: p = BC < = Cal
        ' Case 2.3: BC < p < = Cal
        For Product_Index = i_BC_Month + 1 To Cal_Index
            Product = Product * First_Fraction(Product_Index)
        Next Product_Index
        ' Case 2.4: BC < = Cal < p
        For Product_Index = Cal_Index + 1 To 12
            Product = Product * (1 − First_Fraction(Product_Index))
```

```
        Next Product_Index
        Sum = Sum + Product
        Next Cal_Index
        Cal2Bcast = Sum/(Det1 − Det2)
End Function
```

Because this information is in a format available for processing, such functions as an administrator alert can be provided to indicate low performance of a given salesperson, market or time segment, for instance. Additionally, if it appears that the total revenue is going to be significantly less than the forecast, alerts can be generated as well as where it is projected that the inventory will not sell-out, or would oversell.

Various scenarios can be developed wherein the effects of increasing or decreasing rates can be measured or predicted, based on historical information, for instance. Administrative level programmers can adjust various factors, including the graphic slide switches, to manipulate data regarding weekly percentages, revenue-to-date, forecast revenue, and remaining revenue factors, as well as the unit rates on daily and hourly bases. Other information, such as the ratings value percent, day part value percent, current rate and maximum rate, can also be displayed in proper tabular format wherein the one axis is a calendar and the other includes the day part as well as the various data mentioned above. Graphic switches, etc. can be provided on the screen so that this information can be manipulated in various "what if" hypothetical scenarios. Information like forecast revenue or revenue-to-date, remaining available units, remaining additional units that could be added can all be provided in appropriate graphical form. Additionally, various events such as sports events, can be identified in calendars so as to provide the seller with information regarding whether the price should be changed given the nature of the event appearing on the media.

Various revenue forecasts can be provided in graphical form to show the effects of having more or less available slots, increasing or decreasing the rate, and reviewing the revenue forecasts by the range or cumulative revenue forecasts. Additionally, fuzzy controls in the form of slide switches to move up cost per unit or number of units, or to move-up percentage, are provided to manipulate the fuzzy logic. These controls can be in any convenient graphical or non-graphical format.

The present invention has been described by way of the foregoing description of preferred embodiments to which it is not limited. Variations and modifications of the invention will occur to those skilled in the art without departing from the scope of the invention as defined by the claims appended hereto. For instance, while radio, TV and outdoor advertising media have been emphasized, the invention is also useful in areas outside these industries, such as car rental, cruise ship and other types of businesses wherein inventory control is useful.

The invention claimed is:

1. An inventory management system, comprising:
   a performance measurement system for measuring performance of a medium in which units of inventory are used, wherein said units are advertisement opportunities in television, broadcast radio, internet radio, outdoor advertising and entertainment industry events;
   a buyer's criteria submission system, wherein said buyer's criteria includes at least two criterions from a group consisting of the number of people to be exposed to said units, the frequency of people being exposed to said units, the budget for purchase of said units, the demographics of people expected to be exposed to said units, the psychographics of people to be exposed to said units, and the gross number of times people that will be exposed to said units;
   a revenue maximization system which determines a price for said units based on predetermined pricing considerations, wherein said predetermined pricing considerations includes at least three considerations selected from a group consisting of total number of unsold units, category of buyer attempting to purchase said units, the buyer's history in purchasing similar units, and budget of a seller of units;
   a central information storage system for receiving information from said performance measurement system and revenue maximization system to generate scenarios wherein various combinations of units are grouped together to meet a buyer's criteria; and
   a scenario planner to display the various scenarios generated by the central information storage system.

2. The inventory management system according to claim 1, wherein said performance measurement system receives information related to an extent of an audience to which said units are exposed.

3. The inventory management system according to claim 1, wherein said buyer's criteria further includes the desired budget for purchase of the units and performance measurements.

4. The inventory management system according to claim 1 wherein the revenue maximization system manages yield by using the functions of sell-out forecasting, revenue forecasting, fuzzy rules, and pricing adjustment.

5. The inventory management system according to claim 1 wherein the revenue maximization system changes the number of units available.

6. The inventory management system according to claim 1 wherein the revenue maximization system utilizes economic factors which influence demand and various measurement noises are filtered out of these economic factors.

* * * * *